A. L. RIKER.
ANTISKIDDING DEVICE.
APPLICATION FILED JAN. 17, 1913.
1,244,244.
Patented Oct. 23, 1917.
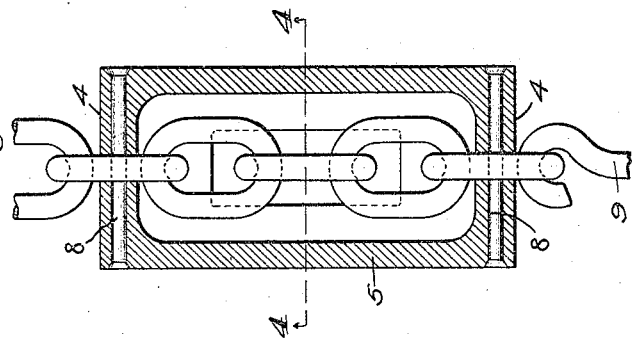
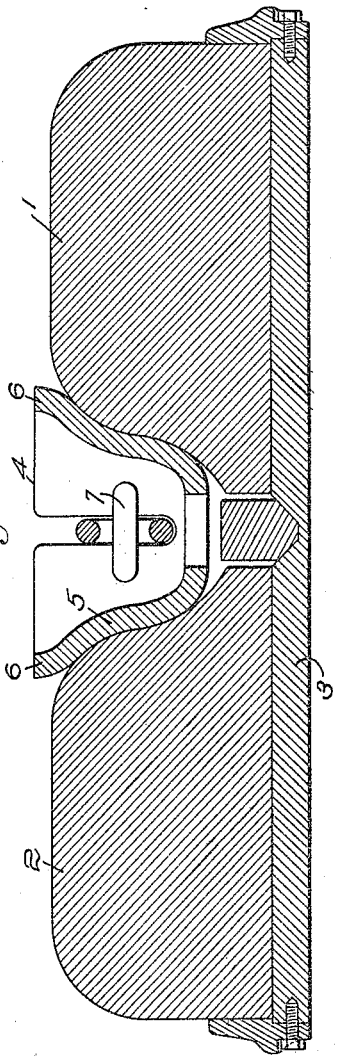
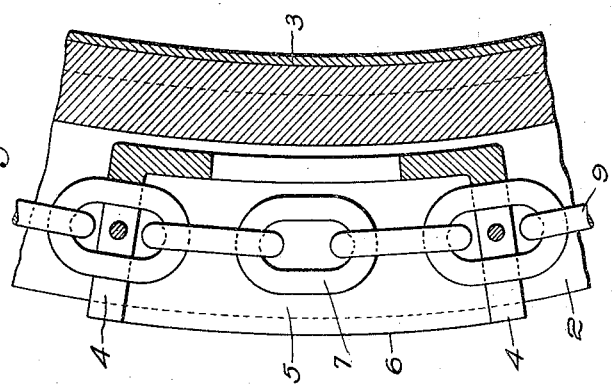
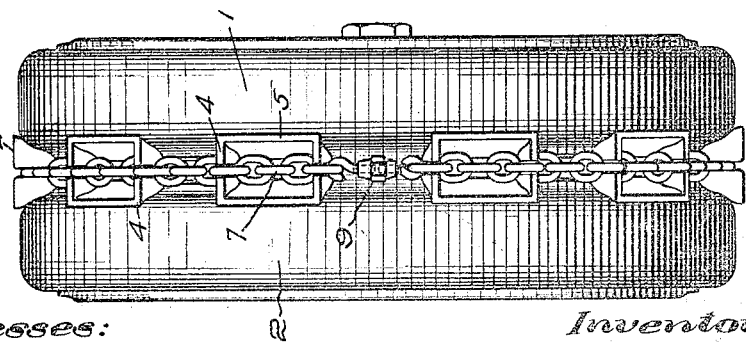
Witnesses:
Carl L. Choate.
Horace A. Grossman
Inventor:
Andrew L. Riker,
by Emery Booth Janney & Varney
Attys.

UNITED STATES PATENT OFFICE.

ANDREW L. RIKER, OF FAIRFIELD, CONNECTICUT, ASSIGNOR TO THE LOCOMOBILE COMPANY OF AMERICA, OF BRIDGEPORT, CONNECTICUT, A CORPORATION OF WEST VIRGINIA.

ANTISKIDDING DEVICE.

1,244,244.  Specification of Letters Patent.  Patented Oct. 23, 1917.

Application filed January 17, 1913. Serial No. 742,566.

*To all whom it may concern:*

Be it known that I, ANDREW L. RIKER, a citizen of the United States, and a resident of Fairfield, county of Fairfield, State of Connecticut, have invented an Improvement in Antiskidding Devices, of which the following description, in connection with the accompanying drawings, is a specification, like characters on the drawings representing like parts.

This invention relates to anti-skidding devices, being more particularly, though not exclusively, intended for use in connection with the tires of heavy, self-propelled vehicles. The invention will be best understood by reference to the following description when taken in connection with the accompanying illustration of one specific embodiment thereof, while its scope will be more particularly pointed out in the appended claims.

In the drawings:

Figure 1 shows in end elevation one type of vehicle tire to which there has been applied an anti-skidding device embodying one form of my invention.

Fig. 2 is a longitudinal section in elevation on a larger scale taken through the center of one of the anti-skidding boxes shown in Fig. 1;

Fig. 3 is a similar section in plan; and

Fig. 4 is a transverse section taken on the line 4—4 in Fig. 3 and showing also the adjacent tire members in section.

Referring to the drawings and to the illustrative embodiment of the invention therein shown, the same is represented as being applied to a form of tire embodying the solid twin tire members 1 and 2 mounted in any suitable manner upon the wheel rim 3, there being left between them a circumferential space or groove wherein the sides of the tires approach each other in a generally converging relation toward the wheel rim. This form of tire is simply illustrative of many different types of vehicle tires and it will be evident that my invention, when applied to types other than the one herein shown, will undergo suitable and appropriate modification.

Referring to the form of the invention shown, the anti-skidding attachment is composed of a series of anti-skidding members adapted to present anti-skidding projections about the tread of the tire. Herein such members are in the form of box-like devices 4, which may be of any suitable material such as cast or malleable iron, such members having flaring sides 5 shaped approximately to fit the circumferential space or groove 6 between the two tire members. Seated in this position against the adjacent and preferably yielding walls of the tires, they are so located as to present anti-skidding edges 6 which are located adjacent the tread surface of the tire. Herein they are so arranged that they project slightly beyond the tread of the tire.

These anti-skid members are arranged at suitable intervals about the periphery of the tire, being held in position by any suitable means such as the chain 7. As shown in the drawings the ends of the boxes have each a narrow slot to receive a link of the chain. To prevent relative displacement of the chain and the boxes a pin 8 may be employed at each opposite end of the box, such pin passing through the side of the box and through the opening in the link where the latter is located in the slot.

The boxes may be initially installed and drawn tightly into position by employing a turn-buckle 9 between two of the boxes and this may also be employed to quickly remove the anti-skidding attachment for purposes of repair or other reasons, or to vary the tension on the chain. The size and shape of the anti-skidding members and the extent to which they project will obviously be varied according to the shape, form, size and resiliency of the tires and the size and weight of the vehicle.

The employment of box like members or those having closed or continuous sides provides projecting members which not only produce an anti-skidding effect but also afford more or less tractive effort. Thus, in the specific structure shown the longitudinal edges provide effective anti-skidding edges, while the transverse edges afford tractive effort and the whole constitutes a very light structure into which the chain is adapted to fit and prevent the circumferential displacement of the members. The bottom of the box like member may be left open or partly open, as shown, so that the relative movement between the walls of the tire and the anti-skidding device will tend to displace any dirt or mud which may tend to accumulate in the device.

While I have herein shown for purposes of illustration one specific form of the invention, it is to be understood that the same is not limited to the constructional details shown, but that extensive deviations may be made therefrom without departing from the spirit of the invention.

Claims.

1. An attachment for dual tread tires comprising a plurality of segmental, channel shaped members constructed to fit between the tire treads and presenting the edges of the channels to the ground adjacent the working surfaces of the tire treads, cross webs having open ended slots uniting and bracing the walls of the channels and a circumferential binding member having portions entering said slots and adjacent portions engageable with the webs adjacent the slots.

2. An attachment for dual tread tires comprising a plurality of segmental, channel shaped members constructed to fit between the tire treads and presenting the edges of the channels to the ground adjacent the working surfaces of the tire treads, cross webs having open ended slots uniting and bracing the walls of the channels and a circumferential binding member of irregular section and presenting in alternation portions receivable in and portions wider than said slots, said members being disposed in spaced relation on said binding member.

3. An attachment for dual tires comprising, in combination, a plurality of anti-skidding members adapted to fit between the tires and be thereby maintained in spaced relation to the wheel rim, said members being in the form of open topped boxes having side walls presenting biting edges at the tread surface and transverse walls between said side walls also presenting biting edges at the tread surface, said members having openings toward the center of the wheel to permit escape of dirt to the groove between the tires whereby said biting edges are maintained clear and efficient, and means for retaining said members in place.

In testimony whereof, I have signed my name to this specification, in the presence of two subscribing witnesses.

ANDREW L. RIKER.

Witnesses:
 WM. S. TEEL.
 B. J. CONNOLLY.

Copies of this patent may be obtained for five cents each, by addressing the "Commissioner of Patents, Washington, D. C."